US010125322B2

(12) United States Patent
Rispoli et al.

(10) Patent No.: US 10,125,322 B2
(45) Date of Patent: Nov. 13, 2018

(54) METHOD FOR REVAMPING A CONVENTIONAL MINERAL OILS REFINERY TO A BIOREFINERY

(71) Applicant: ENI S.p.A, Rome (IT)

(72) Inventors: Giacomo Fernando Rispoli, Rome (IT); Claudia Prati, Anzio (IT); Andrea Amoroso, Rocca Priora (IT); Paolo Pollesel, San Donato Milanese (IT)

(73) Assignee: ENI S.p.A., Rome (IT)

( * ) Notice: Subject to any disclaimer, the term of this patent is extended or adjusted under 35 U.S.C. 154(b) by 0 days.

(21) Appl. No.: 15/824,803

(22) Filed: Nov. 28, 2017

(65) Prior Publication Data
US 2018/0079967 A1 Mar. 22, 2018

Related U.S. Application Data

(62) Division of application No. 14/425,501, filed as application No. PCT/IT2012/000268 on Sep. 4, 2012, now Pat. No. 9,845,432.

(30) Foreign Application Priority Data
Sep. 3, 2012 (IT) .............................. MI2012A1465

(51) Int. Cl.
*C10G 3/00* (2006.01)
*C10G 45/58* (2006.01)
(Continued)

(52) U.S. Cl.
CPC ................. *C10G 3/50* (2013.01); *C10G 3/42* (2013.01); *C10G 3/52* (2013.01); *C10G 45/58* (2013.01);
(Continued)

(58) Field of Classification Search
CPC ... C10G 3/42; C10G 3/50; C10G 3/52; C10G 45/58; C10G 65/043; C10L 1/04; Y02P 30/20
See application file for complete search history.

(56) References Cited

U.S. PATENT DOCUMENTS

2004/0045870 A1  3/2004  Wrisberg et al.
2007/0006523 A1  1/2007  Myllyoja et al.
(Continued)

FOREIGN PATENT DOCUMENTS

EA         200800243 A1    6/2008
WO     WO 2010/077395 A1   7/2010

OTHER PUBLICATIONS

International Search Report dated Apr. 3, 2013 in PCT/IT2012/000268.
(Continued)

*Primary Examiner* — Brian A McCaig
(74) *Attorney, Agent, or Firm* — Oblon, McClelland, Maier & Neustadt, L.L.P.

(57) ABSTRACT

The invention relates to a method for revamping a conventional refinery of mineral oils into a biorefinery, characterized by a production scheme which allows the treatment of raw materials of a biological origin (vegetable oils, animal fats, exhausted cooking oils) for the production of biofuels, prevalently high-quality biodiesel.

This method allows the re-use of existing plants, allowing, in particular, the revamping of a refinery containing a system comprising two hydrodesulfurization units, U1 and U2, into a biorefinery containing a production unit of hydrocarbon fractions from mixtures of a biological origin containing fatty acid esters by means of their hydrodeoxygenation and isomerization, wherein each of the hydrodesulfurization units U1 and U2 comprises:

(Continued)

a hydrodesulfurization reactor, (A1) for the unit U1 and (A2) for the unit U2, wherein said reactor contains a hydrodesulfurization catalyst;

one or more heat exchangers between the feedstock and effluent of the reactor;

a heating system of the feedstock upstream of the reactor;

an acid gas treatment unit downstream of the reactor, containing an absorbent (B) for $H_2S$, said unit being called T1 in the unit U1 and T2 in the unit U2, and wherein said method comprises:

installing a line L between the units U1 and U2 which connects them in series;

installing a recycling line of the product for the unit U1 and possibly for the unit U2, substituting the hydrodesulfurization catalyst in the reactor A1 with a hydrodeoxygenation catalyst;

substituting the hydrodesulfurization catalyst in the reactor A2 with an isomerization catalyst;

installing a by-pass line of the acid gas treatment unit T2 of the unit U2;

substituting the absorbent (B) in the acid gas treatment unit T1 with a specific absorbent for $CO_2$ and $H_2S$.

The operative configuration obtained with the method, object of the present invention, also leads to a substantial reduction in emissions of pollutants into the atmosphere, with respect to the original operative mode.

The invention also relates to the transformation unit of mixtures of a biological origin obtained with said conversion method and particularly hydrodeoxygenation and isomerization processes.

5 Claims, 1 Drawing Sheet

(51) Int. Cl.
  *C10G 65/04* (2006.01)
  *C10L 1/04* (2006.01)

(52) U.S. Cl.
  CPC .............. *C10G 65/043* (2013.01); *C10L 1/04* (2013.01); *C10G 2300/4056* (2013.01); *C10L 2290/10* (2013.01); *C10L 2290/54* (2013.01); *Y02A 50/2327* (2018.01); *Y02E 50/13* (2013.01); *Y02P 30/20* (2015.11); *Y10T 29/49346* (2015.01)

(56) References Cited

U.S. PATENT DOCUMENTS

| | | |
|---|---|---|
| 2009/0193709 A1 | 8/2009 | Marker et al. |
| 2012/0156109 A1 | 6/2012 | Parimi et al. |
| 2012/0157297 A1 | 6/2012 | Nguyen et al. |
| 2012/0157299 A1 | 6/2012 | Nguyen et al. |
| 2012/0157727 A1 | 6/2012 | Parimi et al. |

OTHER PUBLICATIONS

Juan Antonio Melero, et al., "Biomass as renewable feedstock in standard refinery units, Feasibility. opportunities and challenges" Energy & Environmental Science, vol. 5, No. 6, XP055046884, 2012. pp. 7393-7420.

Combined Office Action and Search Report dated Jun. 6, 2016 in Russian Patent Application No. 2015109375 (with English language translation).

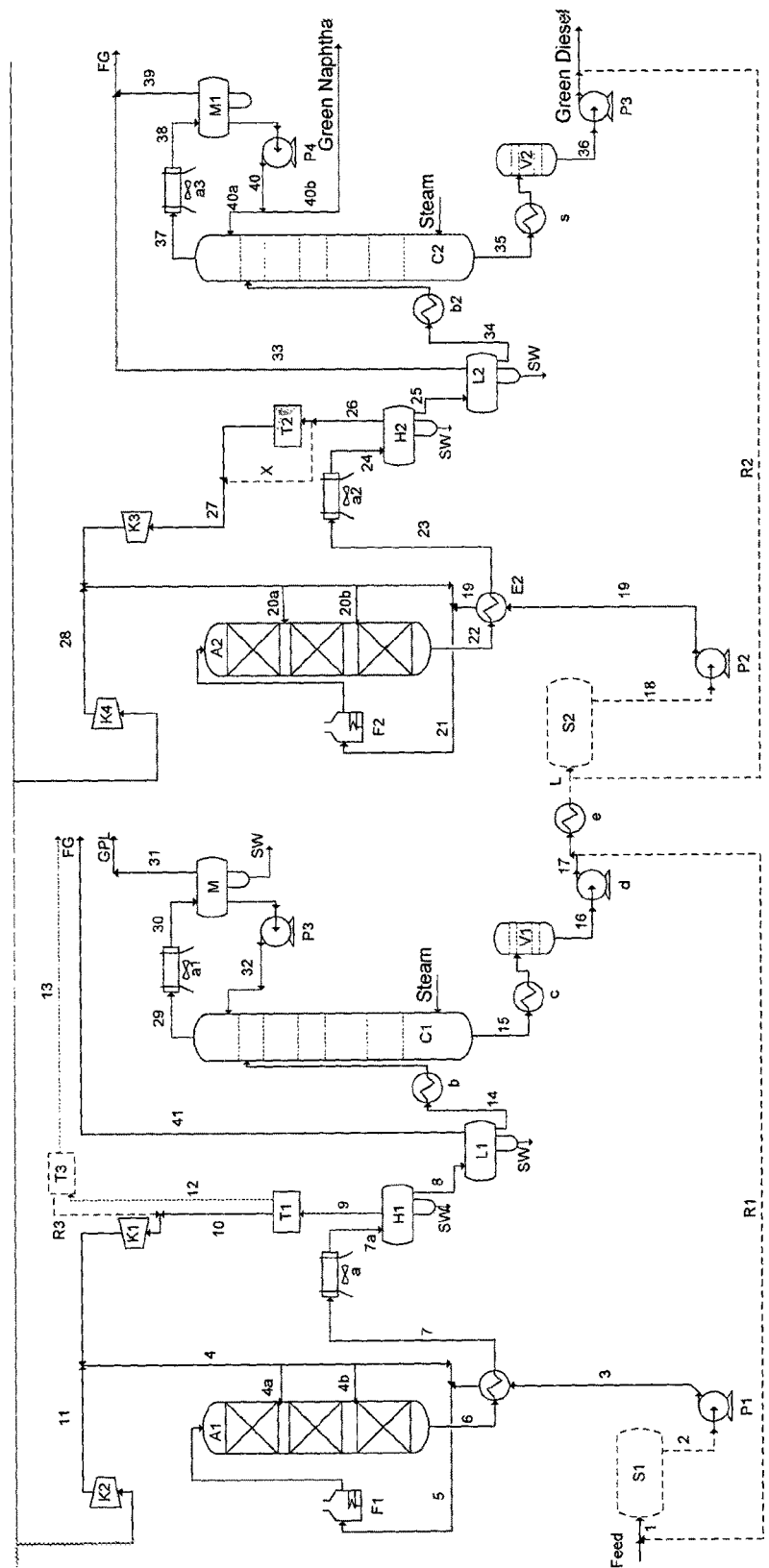

METHOD FOR REVAMPING A CONVENTIONAL MINERAL OILS REFINERY TO A BIOREFINERY

The present application is a divisional of U.S. patent application Ser. No. 14/425,501 filed on Apr. 30, 2015, which is a 35 U.S.C. § 371 national stage patent application of international patent application PCT/IT12/000268, filed on Sep. 4, 2012 and which claims priority from MI2012A001465 filed on Sep. 3, 2012. The disclosures of said applications are hereby incorporated by reference in their entirety.

A method is described for revamping a conventional refinery of mineral oils into a biorefinery, characterized by a production scheme which allows the treatment of raw materials of a biological origin (vegetable oils, animal fats, exhausted cooking oils) for the production of biofuels, prevalently high-quality biodiesel.

This method allows the re-use of existing plants, allowing, in particular, the revamping of hydrodesulfurization plants into production plants of hydrocarbon fractions which can be used as diesel fuel, or as diesel fuel components, starting from a mixture of a biological origin containing triglycerides possibly with aliquots of free fatty acids. Together with diesel fuel, the plants deriving from the reconversion of desulfurization plants also produce aliquots of naphtha and LPG, which are consequently also products deriving from mixtures of a biological origin.

Through this method, it is possible to re-use existing equipment of hydrodesulfurization units by means of a rearrangement which allows to obtain a new configuration, suitable for carrying out processes for the production of fuel bases from biological mixtures, in particular diesel: said rearrangement is capable of providing the same efficiency as a plant specifically constructed for this process, with reduced costs.

Furthermore, as the hydrodesulfurization unit is normally inserted in a refinery context, its rearrangement to a transformation unit of biological feedstocks into diesel fuel allows to exploit products and by-products of the same refinery in the transformation process of biological material, by integration of the refinery units producing them with the new configuration and the new use of the hydrodesulfurization unit, also enabling the use of all the auxiliary services normally present in a refinery.

The use of vegetable oils in diesel engines goes back to Rudolf Diesel, who, in 1900, demonstrated the capacity of diesel engines of functioning with peanut oil. During the second world war, both palm oil and peanut oil were used in Africa as fuel for military vehicles. After the war, technological development led to an almost exclusive use of fuels deriving from petroleum; in addition, diesel engines were enormously improved, mainly with respect to the injectors and control systems, to such an extent that there was little flexibility for the use of fuels different from gasoil. At the same time, vegetable fuels were progressively abandoned due to the high production cost and inconstancy in the product quality.

During the oil crisis of the seventies', attention was refocused on the use of vegetable oils as diesel fuels, but this was difficult for various reasons (formation of crusting in the combustion chamber, blockage of the injectors, dilution of the lubricant). Research activities were therefore directed towards the preparation, starting from vegetable oils, of methyl or ethyl esters and their use in diesel engines. Methyl and ethyl esters of fatty acids are obtained from vegetable oils by transesterification with methanol or ethanol.

An alternative approach for the conversion of vegetable oils was proposed in the eighties' and consists in their deep hydrogenation to produce hydrocarbon fractions with a boiling point compatible with diesel fuels obtained from mineral oil. The deep hydrogenation of vegetable oils causes the removal of oxygen with the contemporaneous formation of a mixture of $H_2O$, $CO_2$ and CO, in reciprocal ratios varying according to the operative conditions. The starting components are thus prevalently transformed into hydrocarbons with respect to triglycerides, and also fatty acids and glycerin. Small quantities of free alcohols can be formed together with the hydrocarbons.

The deep hydrogenation reaction of fatty oils to produce liquid fuels was studied for example, again in the eighties', by Nunes et al., who, in the article entitled "Hydrocraquage sous pression d'une huile de soja: procédé d'étude et allure generale de la transformation" (Rev. Inst. Fr. Pet. Of 1086, vol. 41, page 421 onwards) describes the hydrocracking of soya oil with a bifunctional catalyst. At temperature higher than 673 K, decarbonylation and decarboxylation of the fatty acids are observed, together with a strong hydrogenolysis due to the presence of the metallic catalyst. The main products are linear-chain hydrocarbons.

J. Gusmao et al. (Utilization of vegetable oils as an alternative source for diesel-type fuel: hydrocracking on reduced $Ni/SiO_2$ and sulphided $Ni$—$Mo/Al_2O_3$, Catalysis Today 5 of 1989 page 533 onwards) demonstrates how, in the hydrogenation of soya oil, the hydrocarbon fraction obtained mainly consists of linear paraffins (96% molar of $C_{15}$-$C_{16}$-$C_{17}$-$C_{18}$).

U.S. Pat. No. 4,992,605 describes a process for producing hydrocarbon fractions in the $C_{15}$-$C_{18}$ range by the hydrogenation of vegetable oils such as sunflower oil, rape oil, canola oil, palm oil, or fatty oils contained in the pulp of pine trees (tall oil). This hydrocarbon fractions prevalently consists of linear paraffins ($C_{15}$-$C_{18}$) and is characterized by a high cetane number, which is such that it can be used as a cetane improver.

In "Hydroprocessed vegetable oils for diesel fuel improvement", Bioresources Technology 56 (1996), pages 13 to 18, the application described in U.S. Pat. No. 4,992,605 is summarized, on a laboratory scale to produce a hydrogenated product starting from canola oil.

EP 1396531 describes a process for the production of hydrocarbon components from mixtures of a vegetable or animal origin. The formation of a mixture with a content of iso-paraffins of 73% is described. The process comprises a pre-hydrogenation step, a hydrodeoxygenation step (HDO) and an isomerization step which operates using the countercurrent flow principle.

EP 1728844 describes a process for the production of hydrocarbon components from mixtures of a vegetable or animal origin. The process comprises a pretreatment step of the mixture of a vegetable origin for removing contaminants, such as, for example, alkaline metals, followed by a hydrodeoxygenation (HDO) step and possibly an isomerization step.

EP 2084245 describes a process for the production of a hydrocarbon mixture that can be used as diesel fuel or diesel component by the hydrodeoxygenation of a mixture of a biological origin containing fatty acid esters possibly with aliquots of free fatty acids, such as for example vegetable oils such as sunflower oil, rape oil, canola oil, palm oil, or fatty oils contained in the pulp of pine trees (tall oil), followed by hydroisomerization on specific catalysts, which allows to obtain hydrocarbon mixtures in which the content of isoparaffins can exceed 80%, the remaining percentage being n-paraffins.

Current regulations require that fuel components from renewable sources, for example from mixtures of a biological origin containing fatty acid esters, be present in fuels for a percentage of around 4.5% (referring to calorific value) for 2012, which will be equal to 5.0% within 2014 and will reach 10% in 2020, according to Dlg. n° 28 of 2011 which implements the Europe Directive 2009/28/CE.

The biological diesel component which is currently used in most cases is FAME (Fatty Acid Methyl Ester) i.e. a mixture of methyl esters of fatty acids deriving from the transesterification with methanol of triglycerides contained in vegetable oils. For as much as it is widely used, FAME has disadvantages from a quality point of view, due to the low calorific value (about 38 kJ/kg) and poor cold properties (Cloud point from −5° C. to +15° C.)

As FAME is miscible with water, moreover, it can cause pollution in tanks, it has a low stability, tends to polymerize forming rubbers and other undesired products, causes fouling, thus dirtying of the filters, and dissolves in lubricating oil. For these reasons, various automobile companies are advising against the use of FAME in their engines. This results in the possibility of using FAME in a limited maximum quantity which is such as to not satisfy the standards required by the directive 2009/28/CE (RED) for the promotion of the use of energy from renewable sources and the directive 2009/30/CE (FQD) for product quality.

There is therefore the necessity of producing higher-quality components for diesel of a biological origin, and of consequently increasing the production of diesel of a biological origin, in short times, in particular using technologies which produce higher-quality components. New dedicated plants are therefore required for facing the necessity of increasing the production capacity of high-quality biological components.

In view of the construction of new plants, which requires lengthy times and high investments, above all for the reactors, that must operate with a high hydrogen pressure, compressors and other machines and for the construction of a hydrogen production plant, the necessity is strongly felt for finding alternative solutions which allow the exploitation of existing production units by conversion of pre-existing plants, with the least possible invasiveness and as economically as possible.

A method has now been found for transforming hydrodesulfurization units into conversion units of mixtures of a biological origin, based on triglycerides, into biocomponents for fuels, in particular for diesel and possibly jet fuel, LPG and gasoline: the new method is based on appropriate variations in the configuration of units already existing with the selection of equipments that can be converted rather than modified and a limited number of substitutions and new installations. This method is of particular interest within the current economic context which envisages a reduction in the demand for oil products and refinery margins, allowing the production cycle to be modified through the transformation of already-existing hydrodesulfurization units in oil refineries into production units of hydrocarbon mixtures that can be used as fuels from mixtures of a biological origin.

This conversion of mixtures of a biological origin into biocomponents consists in the production of hydrocarbon fractions from mixtures of a biological origin containing triglycerides, by means of their hydrodeoxygenation and isomerization: said conversion is indicated hereunder with the name "HDO/ISO process". The "HDO/ISO process" therefore refers to a process for producing, as main product, a hydrocarbon fraction which can be used as diesel fuel, or as diesel fuel component, starting from a mixture of a biological origin containing fatty acid esters, and possibly containing free fatty acids, which comprises the following steps:

1. Hydrodeoxygenation of the mixture of a biological origin;
2. Hydroisomerization of the mixture resulting from step (1), after a possible purification treatment.

In said HDO/ISO process, the mixture of a biological origin is a mixture of a vegetable or animal origin, and the fatty acid esters contained therein are fatty acid triglycerides, wherein the hydrocarbon chain of the fatty acid contains from 12 to 24 carbon atoms and is mono- or poly-unsaturated. The mixtures of a biological origin can be selected from vegetable oils, vegetable fats, animal fats, fish oils or mixtures thereof: the vegetable oils or fats, possibly deriving from plants selected by genetic manipulation, are selected from sunflower, rape, canola, palm, soya, hemp, olive, linseed, mustard, peanut, castor, coconut oils, fatty oils contained in the pulp of pine trees (tall oil), oils extracted from seaweeds, recycled oils or fats of the food industry and mixtures thereof, and the animal oils or fats are selected from lard, tallow, milk fats, recycled oils or fats of the food industry and mixtures thereof.

In the HDO/ISO process, the hydrodeoxygenation HDO step is carried out in the presence of hydrogen and a hydrogenation catalyst containing a carrier and one or more metals selected from metals of group VIII and group VIB. Preferably the catalysts are previously sulfided, by means of the known techniques. In order to keep the catalyst in sulfided form, the sulfiding agent, for example dimethyldisulfide, is fed in continuous, contemporaneously with the feedstock, in a percentage ranging from 0.02-0.5% weight (140-3400 ppm S).

The hydrodeoxygenation HDO step is normally done at a pressure ranging from 25 to 70 bar and at a temperature ranging from 240 to 450° C.

In the HDO/ISO process, the mixture of a biological origin can be subjected to a pretreatment before being fed to the HDO step (1), wherein said pretreatment can be effected by adsorption, treatment with ion exchange resins or mild acid washings.

The mixture resulting from the HDO step (1) is subjected to a purification treatment before being subjected to hydroisomerization, wherein the purification treatment comprises a separation step and a washing step, in particular the mixture resulting from step (1) can be sent to a high-pressure gas-liquid separator in order to recover a gaseous phase and a liquid phase.

The gaseous phase, containing hydrogen, water, CO, $CO_2$, light paraffins (C4−) and small quantities of $NH_3$, $PH_3$ and $H_2S$, is cooled: upon condensation, the water and condensable hydrocarbons are separated, and the remaining gaseous phase is purified to obtain hydrogen that can be recycled to the reaction step (1). The liquid phase separated in the high-pressure separator, composed of a hydrocarbon fraction, essentially consisting of linear paraffins with a number of carbon atoms ranging from 14 to 21, is fed to the subsequent hydroisomerization step (2).

The hydroisomerization step (2) (ISO) can be effected at a temperature ranging from 250 to 450° C., and a pressure ranging from 25 to 70 bar.

Isomerization catalysts that can be conveniently used are catalysts containing metals of group VIII, and a carrier selected, for example, among alumina or silica or silico-aluminas or zeolites. The metal of group VIII is preferably Pt, Pd or Ni.

According to a particularly preferred aspect, according to what is described in WO 2008/058664 and in WO2008/113492, a catalytic composition Me/MSA is used in the isomerization step, which comprises:

a) a carrier of an acid nature (NSA) comprising a completely amorphous, micro-mesoporous silico-alumina having a molar ratio $SiO_2/Al_2O_3$ ranging from 30 to 500, surface area greater than 500 $m^2/g$, a pore volume ranging from 0.3 to 1.3 ml/g, an average pore diameter lower than 40 Å.

b) a metallic component (Me) comprising one or more metals of group VIII, possibly mixed with one or more metals of group VIB.

The operating conditions, catalysts and preferred particular embodiment aspects of the HDO/ISO process are known to experts in the field, and are described, for example, in EP1396531, in EP 1728844, in EP 20884245, in WO 2008/058664, in WO2008/113492, and particular embodiments and utilizations of the HDO/ISO process are also described, for example, in WO2009/039347, WO2009/039335, WO2009/039333, WO2009/158268: all the aspects, operating conditions and catalysts described in these documents can be used for carrying out the HDO/ISO process in the production unit of hydrocarbon fractions from mixtures of a biological origin obtained by applying the method for revamping hydrodesulfurization units according to the present invention.

In accordance with what is specified above, an object of the present invention relates to a method for revamping a refinery comprising a system containing two hydrodesulfurization units, U1 and U2, into a biorefinery comprising a production unit of hydrocarbon fractions from mixtures of a biological origin containing fatty acid esters by means of their hydrodeoxygenation and isomerization,
wherein each of the hydrodesulfurization units U1 and U2 comprises:
  a hydrodesulfurization reactor, (A1) for the unit U1 and (A2) for the unit U2, wherein said reactor contains a hydrodesulfurization catalyst;
  one or more heat exchangers between the feedstock and effluent of the reactor;
  a heating system of the feedstock upstream of the reactor;
  an acid gas treatment unit downstream of the reactor, containing an absorbent (B) for $H_2S$, said unit being called T1 in the unit U1 and T2 in the unit U2, and wherein said method comprises:
  installing a line L between the units U1 and U2 which connects them in series;
  installing a recycling line of the product for unit U1 and possibly for the unit U2,
  substituting the hydrodesulfurization catalyst in the reactor A1 with a hydrodeoxygenation catalyst;
  substituting the hydrodesulfurization catalyst in the reactor A2 with an isomerization catalyst;
  installing a by-pass line X of the acid gas treatment unit T2 of the unit U2;
  substituting the absorbent (B) in the acid gas treatment unit T1 with a specific absorbent for $CO_2$ and $H_2S$.

The term "refinery" normally refers to a complex of industrial plants in which the refining of oil, mineral oils or raw products of a petroleum origin, effected. The refining is mainly oriented towards the production of fuels. Said refinery is normally indicated as conventional refinery.

The term "biorefinery" refers to a complex of industrial plants in which products and raw materials of a biological origin, such as, for example, vegetable oils, animal fats, exhausted cooking oils, are treated, to obtain fuels. The fuels thus obtained are generally indicated as biofuels.

The hydrocarbon fractions that can be obtained from the biorefinery resulting from applying the method according to the present invention, are fuels or fuel components, in particular LPG, kerosene, diesel, naphtha.

The heating system of the feedstock upstream of the reactor is hereinafter called F1 for the unit U1 and F2 for the unit U2.

The new product recycling lines installed in the unit U1 and possibly the unit U2 are hereinafter called R1 for the unit U1 and R2 for the unit U2.

A by-pass line of an apparatus refers to a line that passes around said apparatus and consequently said apparatus is no longer used.

In particular, the by-pass line X passes around the unit T2 which is therefore no longer used.

The two hydrodesulfurization units to which the method of the present invention is applied can be hydrodesulfurization units normally used in parallel in common refinery schemes.

The heating system of the feedstock and the heat exchanger between feedstock and effluent are different from each other.

The production of hydrocarbon fractions from mixtures of a biological origin containing fatty acid esters by means of their hydrodeoxygenation and isomerization, corresponds to the "HDO/ISO process" previously described, and to all the particular embodiments described and known to experts in the field. The unit of production of hydrocarbon fractions from mixtures of a biological origin containing fatty acid esters by means of their hydrodeoxygenation and isomerization, is hereinafter called "HDO/ISO unit". The term "unit" refers to the combination of apparatuses for the embodiment of a process or treatment.

Desulfurization units that can be used for the method of the present invention are all units known to experts in the field: said desulfurization units comprise the hydrodesulfurization reactor containing the hydrodesulfurization catalyst, one or more heat exchangers between feedstock and effluent, a heating system of the stream at the inlet of the reactor, an acid gas treatment unit downstream of the reactor, containing a specific absorbent for $H_2S$.

As is known to experts in the field, the hydrodesulfurization reactor is normally made of low-bound carbon steel (for example 1¼ Cr-1/2 Mo, 2¼ Cr-1 Mo) with respect to the reactor jacket, with a stainless steel internal lining of the type 321 SS, 347 SS. The reactor interiors are generally made of stainless steel of the type 321 SS, according to what is suggested by the standard API 941-2004. The hydrodesulfurization reactors that can be used and their configurations are well-known to experts in the field and are described for example in Handbook of Petroleum Refining Processes, Robert A. Meyers.

The desulfurization catalysts are well-known to experts in the field, and can be selected from hydrogenation catalysts containing a carrier, normally alumina, and one or more metals selected from metals of group VIII and group VIB, for example CoMo/Alumina; CoMo—NiMo/Alumina, and are described, for example in "Petroleum Refining: Technology and Economics", of James H. Gary, Glenn E. Handwerk and "Hydrotreating and hydrocracking fondamentals", P. R. Robinson, G. E Dolbear.

The heat exchanger of the feedstock-effluent exchange train used in a desulfurization unit are normally made of low-bound carbon steel (1 Cr-½ Mo) with possible inner coating of stainless steel (347 SS) or totally of stainless steel (347Ss, 321 SS), for high-temperature feedstock-effluent exchangers, whereas it is made of simple or work-hardened carbon steel (CS or KCS) for exchangers operating at lower temperatures. These exchangers allow heat exchange between feedstock to the reactor and its effluent. Heating systems, situated upstream of the hydrodesulfurization reactor and operating over the feedstock to the reactor can be selected from direct fired ovens and heat exchangers. An oven comprising a radiating section and possibly a convective section is preferably used.

The description of heating systems, and in particular ovens and their configurations and production suitable for hydrodesulfurization units can be found, for example, in "Handbook of Petroleum Processing", edited by David S. J. Jones and Peter P. Pujadó.

Acid gas treatment units suitable for being used in hydrodesulfurization units, their configurations and specific absorbents for the absorption of $H_2S$ are well-known to experts in the field and are described, for example, in Selecting Amines for Sweetening Units, Polasek, J. (Bryan Research & Engineering) and Bullin, J. A. (Texas A&M University), Gas Processors Association Regional Meeting, September 1994.

An acid gas treatment unit refers to a system in which one or more gases of an acid nature are separated from a gaseous mixture containing them by absorption with an absorbent and recovered by regeneration of the absorbent.

Absorbents which can be used are, for example, solvents, preferably of the alkanol-amine type, for example MDEA (methyl-diethanol-amine) or DEA (diethanolamine).

One or more sulfur recovery units which can be used in the method of the present invention, are also normally present in refineries, as will be described in more detail hereunder: said sulfur recovery units are well-known to experts in the field and comprise a primary sulfur recovery section, of the Claus type, and possibly a tail-gas treatment section suitable for increasing the conversion to sulfur. In particular, a sulfur recovery unit of the Claus type is composed of a first thermal reaction step, consisting of the furnace in which the acid gas is burnt at temperatures higher than 1500° C. and where the Claus reaction takes place (3H2S+(3/2)O2=>3S+3H2O), which converts about 70% by weight of the sulfur at the inlet of the unit, followed by a catalytic section, consisting of two or more catalytic reactors, containing an alumina bed, where part of the non-reacted $H_2S$ is converted to elemental sulfur, alternated by an intermediate cooling suitable for condensing the sulfur produced. A Claus unit thus formed reaches a recovery of about 96%-98% by wieght of the sulfur at the inlet. Said Claus unit and the catalysts used therein are well-known to experts in the field and are described, for example, in Fundamental and Practical Aspects of the Claus Sulfur Recovery Process P. D. Clark, N. I. Dowling and M. Huang, Alberta Sulfur Research Ltd., Calgary, Alberta, Canada.

In the method of the present invention, the substitution of the hydrodesulfurization catalyst inside the reactors A1 and A2 with HDO and ISO catalysts, respectively, does not involve any particular difficulty and can be easily effected. Said HDO and ISO catalysts can be selected from known hydrodeoxygenation and isomerization catalysts, in particular those previously described.

The units U1 and U2 also preferably contain hydrogen recycling lines, and relative compressors, which connect the acid gas treatment units which are situated downstream of the reactors, with the same reactors: said lines, and relative compressors, are re-used for the same purpose in the production unit of hydrocarbon fractions from mixtures of a biological origin obtained by the revamping method of the present invention.

A particularly preferred aspect relates to a method according to the present invention, additionally operating so as to recycle the $H_2S$ formed by the HDO step, after recovering it from the absorbent (B) of T1. The $H_2S$ is formed by decomposition of the sulfiding agents fed to the HDO reactor A1 for maintaining the hydrodeoxygenation catalyst in its sulfided form, i.e. active form. In the HDO step, $CO_2$ is also formed by decarboxylation of the fatty acid esters.

As further described hereunder, in order to separate the $H_2S$, the mixture of $CO_2$ and $H_2S$ formed during the HDO step must be received from the absorbent of T1 and, after separating the $H_2S$ from the $CO_2$, by means of two additional absorption/regeneration steps, carried out in a further acid gas treatment unit, called T3, the resulting stream of $H_2S$ from the HDO section is recycled, as sulfiding agent of the catalyst of the reactor A1, preferably sending it to the compressor K1 of the hydrogen recycling line of the unit U1 by means of a new line R3 installed for this purpose.

In particular, the line R3 is connected to the suction of said compressor K1.

In accordance therefore with a preferred aspect, the method of the present invention also comprises the addition of said further acid gas treatment unit T3, downstream of the unit T1 and connected to said unit T1, in which the two above-mentioned additional absorption/regeneration steps can be effected, and the installation of said new recycling line of $H_2S$ between the unit T3 and the HDO section, preferably in the suction phase of the compressor K1 which is situated on the hydrogen recycling line of the unit U1. The unit T3 contains two absorbing areas each containing a specific absorbent for $H_2S$.

By applying, in accordance with the method of the present invention, said further modifications to the system comprising the units U1 and U2, the objective is reached of recycling the $H_2S$ to the HDO reactor A1 in order to maintain the catalyst in its sulfided form, guaranteeing its activity without the necessity of feeding other sulfiding agents, of the type DMDS, or in any case feeding said sulfiding agents in a more limited quantity.

A further advantage of said recycling of the $H_2S$ lies in the substantial reduction in emissions of acid gas, which is reduced to $CO_2$ alone, and which consequently does not have to be treated in the Claus plant, not strictly necessary unless there are other sources of $H_2S$, but can be sent directly to the final thereto-combustor of the sulfur recovery unit.

In accordance with what is specified above, a preferred aspect of the present invention therefore relates to a method for revamping a refinery comprising a system containing two hydrodesulfurization units, U1 and U2, into a biorefinery containing a HDO/ISO unit comprising a hydrodeoxygenation section HDO and an isomerization section ISO, wherein each of the hydrodesulfurization units, U1 and U2 comprises:
  a hydrodesulfurization reactor, (A1) for the unit U1 and (A2) for the unit U2, wherein said reactor contains a hydrodesulfurization catalyst;
  one or more heat exchangers between the feedstock and effluent of the reactor;
  a heating system of the feedstock upstream of the reactor;
  an acid gas treatment unit downstream of the reactor, containing an absorbent (B) for $H_2S$, said unit called T1 in the unit U1 and T2 in the unit U2, and wherein said method comprises:
  installing a line L between the units U1 and U2 which connects them in series;
  installing a recycling line of the product for the unit U1 and possibly for the unit U2,
  substituting the hydrodesulfurization catalyst in the reactor A1 with a hydrodeoxygenation catalyst;
  substituting the hydrodesulfurization catalyst in the reactor A2 with an isomerization catalyst;
  installing a by-pass line X of the acid gas treatment unit T2 of the unit U2;
  substituting the absorbent (B) in the acid gas treatment unit T1 with a specific absorbent for $CO_2$ and $H_2S$;
  installing an acid gas treatment unit T3 downstream of the acid gas treatment unit T1 to separate the $H_2S$;
  recycling the $H_2S$ to the reactor A1.

The flow of $H_2S$ at the outlet of T3 can reach the reactor A1 by means of a new line that is connected in any point of the unit U1 suitable for the purpose.

According to what is specified above, a particularly preferred aspect of the present invention relates to a method for revamping a refinery comprising a system containing two hydrodesulfurization units, U1 and U2, into a biorefinery containing a HDO/ISO unit, wherein each of the hydrodesulfurization units U1 and U2 comprises:
  a hydrodesulfurization reactor, (A1) for the unit U1 and (A2) for the unit U2, wherein said reactor contains a hydrodesulfurization catalyst;
  one or more heat exchangers between the feedstock and effluent of the reactor;
  a heating system of the feedstock upstream of the reactor;
  an acid gas treatment unit downstream of the reactor, containing an absorbent (B) for $H_2S$, said units being called T1 in the unit U1 and T2 in the unit U2,
  a hydrogen recycling line and a compressor on said line, said compressor being called K1 for the unit U1 and K2 for the unit U2,
and wherein said method comprises:
  installing a line L between the units U1 and U2 which connects them in series;
  installing a recycling line of the product for the unit U1 and possibly for the unit U2,
  substituting the hydrodesulfurization catalyst in the reactor A1 with a hydrodeoxygenation catalyst;
  substituting the hydrodesulfurization catalyst in the reactor A2 with an isomerization catalyst;
  installing a by-pass line X of the acid gas treatment unit T2 of the unit U2;
  substituting the absorbent (B) in the acid gas treatment unit T1 with a specific absorbent for $CO_2$ and $H_2S$;
  installing an acid gas treatment unit T3 downstream of the acid gas treatment unit T1;
  installing a recycling line R3 of $H_2S$ from the unit T3 to the compressor K1 of the hydrogen recycling line of the unit U1, preferably to the suction of the compressor K1.

As previously specified, one or more sulfur recovery units are normally present in refineries. These sulfur recovery units are well-known to experts in the field and have already been described. In particular, sulfur recovery units of the Claus type are preferably used in refineries: this type of unit has been previously described and, as already specified, substantially comprises a thermal reaction section and a catalytic section.

A further particularly preferred aspect relates to a method according to the present invention in which the unit U1 is connected to a sulfur recovery unit, preferably a Claus unit, by the installation of a by-pass line of the thermal section of said sulfur recovery unit, and substitution of the catalyst of the first reactor of the catalytic section with a cold selective redox catalyst, capable of converting $H_2S$ into liquid sulfur. Catalysts suitable for the purpose can be selected from oxides of metals of group VIB combined with transition metals of group VIII and are described for example in U.S. Pat. No. 6,372,193 and in the documents cited therein.

A further aspect of the present invention is to install a surge drum (S) upstream of each of the reactors A1 and A2.

The hydrodesulfurization units can contain, in addition to what has already been described above:
  a line for feeding make-up hydrogen possibly after mixing it with recycled hydrogen, to each of the reactors (A1) and (A2), wherein said line can derive for example from the refinery hydrogen network or directly from a reforming unit;
  a fractionation unit of the products obtained, a gas separation/washing unit, particularly fuel gas and gas rich in propane which is formed during the process, downstream of each of the reactors (A1) and (A2);
wherein all these equipments remain unvaried, do not undergo changes or modifications due to the transformation method of the present invention and are re-used as such, thus also being included in the production unit of hydrocarbon fractions from mixtures of a biological origin containing fatty acid esters by means of their hydrodeoxygenation and isomerization, as said unit results after application of the transformation method of the present invention.

As previously specified, connection lines can be present between a reforming unit and each of the reactors (A1) and (A2), as the reforming unit is normally present in a refinery together with the desulfurization unit. Said lines, called (LH1) and (LH2), allow the hydrogen formed in the reforming unit as by-product, to be used, whether it is a catalytic reforming unit or a steam reforming unit: said lines can therefore be part, as such, of the production unit of hydrocarbons from mixtures of a biological origin: and be used without undergoing any modification.

The revamping of a refinery containing hydrodesulfurization units through the operations described above, allows to obtain, with minimum interventions, times and costs, a biorefinery containing a transformation unit of mixtures containing fatty acid esters into hydrocarbon mixtures that can be used as diesel and diesel components by means of a process comprising a hydrodeoxygenation step and an isomerization step.

In particular, for carrying out the HDO/ISO process previously described, the hydrodeoxygenation step (HDO) is carried out in one of the hydrodesulfurization reactors, the reactor (A1), in which the structure of the triglycerides contained in the mixture of a biological origin is transformed into paraffinic compounds with the contemporaneous production of propane, $CO_2$ and water. As the HDO reaction is exothermic, the exothermicity is controlled by means of suitable product recycling, effected through a new line (R1) introduced downstream of the reactor: the product recycling, through a dilution effect, controls the temperature increase in the same reactor. The exothermicity can also be controlled with hydrogen quenching, which can already be normally present in the hydrodesulfurization units, alternating with the various catalytic beds. The new recycling line of the reaction product (R1) is such as to allow a flow-rate equal to even double that of the fresh feedstock being fed to the reactor.

A surge drum (S) can be additionally inserted upstream to the reactor used for the hydrodeoxygenation step and upstream to the reactor used for the isomerization step (ISO): said drum has the purpose of equalizing the feedstock, consisting of fresh feedstock plus reacted recycled product.

The reactor used for effecting the HDO step, deriving, through the method of the present invention, from a pre-existing hydrodesulfurization unit, may not have a metallurgy suitable for guaranteeing its use in the presence of high concentrations of free fatty acids in the feedstock consisting of a mixture of vegetable oils. The reactors of the HDO/ISO units specifically constructed for this purpose, are in fact made of stainless steel (316 SS, 317 SS), to allow them to treat contents of free fatty acids of up to 20% by weight of the feedstock. The desulfurization reactor, produced with the typical metallurgy described above, can in any case be used for the treatment of mixtures of a biological origin normally available on the market, containing free fatty acids in a quantity not exceeding the safety threshold of 1,000 ppm by weight. If it is convenient to use mixtures of a biological origin with a content of fatty acids higher than this threshold, a pretreatment of the feedstock suitable for reducing this content can be possibly effected. If this treatment is used, a pretreatment unit of the feedstock is added upstream of the unit A1, in order to lower its content of free fatty acids.

The hydrocarbon product resulting from the HDO step is fed through the new connection line (L) to the isomerization section where the isomerization step takes place, in the reactor A2, with possible recycling of the isomerization product to the same reactor A2, by means of a new line (R2), in order to ensure the wettability of the catalyst, thus also allowing the use of a low quantity of fresh feedstock.

As previously specified, each of said hydrodesulfurization units to which the revamping method of the present invention is applied, contains an acid gas treatment unit, hereinafter called acid gas washing unit, normally operating downstream of a high-pressure separator, situated on the reactor effluent, whose function is to purify the hydrogen leaving the reactor, by separation from the $H_2S$ formed during the hydrodesulfurization, before said hydrogen is recycled. Furthermore, the desulfurization unit normally contains a low-pressure separator from which fuel gas (FG) is separated, containing methane, ethane and $H_2S$, whereas the liquid fraction is sent to a stripping column, suitable for separating LPG and naphtha at the head and desulfurized gas oil at the bottom of the column. A vacuum dryer is normally inserted on the line of the desulfurized product for removing possible traces of water present in the product, before sending it to storage. According to the method of the present invention, the new connection line (L) installed between the two units U1 and U2, is preferably inserted downstream of said drying unit, if present in the unit U1, or it is inserted downstream of the stripping column of the unit U1.

As previously described, said high- and low-pressure separators, said stripping column and said possible dryer remain unvaried, they do not undergo any changes or modifications due to the transformation method of the present invention and are re-used as such, thus also being able to be a part of the production unit of hydrocarbon fractions from mixtures of a biological origin containing fatty acid esters by means of their hydrodeoxygenation and isomerization, as said unit results after application of the transformation method of the present invention.

Due to the different nature of the gases leaving the hydrodeoxygenation reactor, with respect to those generated by the hydrodesulfurization, for which the acid gas treatment unit was designed, hereinafter also called acid gas washing unit, according to the method of the present invention, the absorbent used in the acid gas treatment unit must be substituted: the gas leaving the reactor in which the HDO step is carried out, in fact, mainly contains $H_2$, $H_2S$ and $CO_2$, with a ratio of about 1-5% by weight of $H_2S$ with respect to the total $H_2S$ and $CO_2$, whereas in pre-existing hydrodesulfurization case, the gas leaving the reactor mainly contained $H_2$ and $H_2S$, with a high content of $H_2S$, resulting from the sulfur content of the raw material fed to the refinery.

The acid gas treatment unit therefore contains an absorbent (B) specific for $H_2S$, normally a selective amine for $H_2S$. In the configuration deriving from the method of the present invention, as the reactor upstream of said acid gas separation unit is used for the hydrodeoxygenation of mixtures containing fatty acid esters, the gaseous by-product from which t hydrogen is to be purified before being recycled to the HDO reactor, is mainly $CO_2$, mixed with smaller quantities of $H_2S$, due to the continuous sulfidation of the HDO catalyst.

The varying nature, composition and flow-rate of the gases leaving the HDO reactor can be processed in the pre-existing acid gas treatment unit by simple substitution of the pre-existing absorbent suitable for the absorption of $H_2S$ with a selective absorbent for both $CO_2$ and $H_2S$.

In accordance with the method, object of the invention, the absorbent (B) of T1 is therefore substituted with an absorbent suitable for absorbing both $CO_2$ and $H_2S$, the purified hydrogen is re-fed to the reactor and the gaseous mixture mainly containing $CO_2$ and $H_2S$ (the latter in a quantity normally ranging from 1 to 5% with respect to the sum of $CO_2$ and $H_2S$) is recovered from the absorbent used by means of a regeneration column, said column forming part of the pre-existing acid gas treatment system.

Absorbents suitable for the absorption of $CO_2$ and $H_2S$, in the proportions indicated above, and which can be used in the method of the present invention, are well-known to experts in the field. According to a preferred aspect, amines available on the market, produced by DOW and BASF, are used, and preferably methyldiethanolamine (MDEA) with promoters or activated. Said amines are described, for example, in U.S. Pat. No. 6,337,059. Amines suitable for being used in the present invention, produced by DOW, are, for example, those of the series UCARSOL™ AP, such as, for example, AP802, AP804, AP806, AP810 and AP 814, and preferably UCARSOL™ AP Solvent 810.

The mixture of $CO_2$ and $H_2S$ is recovered from said absorbents by regeneration of the absorbent, particularly in the case of an amine solvent, in a reboiled distillation column, operating at low pressure. Other impurities that may be present in the gases leaving the HDO reactor are removed by means of the same treatment described above.

According to another preferred aspect of the present invention, the $H_2S$ present in the gas leaving the first reactor, A1, can be further concentrated in order to be re-fed to said HDO reactor A1 to keep the catalyst in sulfided form, guaranteeing its activity. According to said preferred aspect, the method of the present invention comprises the installation of a further acid gas treatment unit T3, downstream of the treatment unit T1, in which two further steps are effected, each of which comprises the absorption of a specific solvent, selective for $H_2S$, and relative regeneration. Said steps are suitable for separating the $H_2S$ from the $CO_2$, present in the acid gas stream obtained from the acid gas treatment unit T1 of the unit U1, to obtain a stream of concentrated $H_2S$ to be re-fed to the deoxygenation reactor A1 through the new line R3 previously described, which connects T3 to the HDO section, preferably to the compressor K1 of the hydrogen recycling line, and in particular to the suction of the compressor K1.

Absorbents suitable for the absorption of $H_2S$ alone, which can be used in the method of the present invention for the unit T3, are well-known to experts in the field. According to a preferred aspect, amines available on the market, produced by DOW and BASF, are used, and preferably methyldiethanolamine (MDEA) with promoters or activated. Suitable amines, produced by DOW, are for example those of the series UCARSOL™ HS, such as, for example, HS101, HS102, HS103, HS104, HS115, and preferably UCARSOL™ HS solvent 102.

In the method of the present invention, as previously described, the use of the acid gas absorption section T2 installed on the recycled gas, is not necessary in the ISO section, and for this purpose the by-pass line X is installed: T2 can therefore possibly be re-used for one of the two additional separation steps, necessary for separating the $H_2S$ from the $CO_2$ described above. The use of T2 is not necessary as the flow leaving the reactor A2 does not contain $H_2S$.

The $CO_2$ is then recovered from the head of the two absorption columns and sent to the final thermo-combustor of the sulfur recovery plant (of the Claus type) normally present in refineries, or to any refinery oven previously equipped with specific flues on various burners for the introduction of said stream.

According to another aspect of the method of the present invention, the refinery in which said method of the present invention is applied, is equipped with a sulfur recovery unit, wherein said unit has been previously described and is preferably a Claus unit, which can be used, according to the method of the present invention, for treating the $CO_2/H_2S$ gaseous mixture leaving the acid gas treatment unit according to two possible modes, a traditional operative mode and a modified operative mode.

The traditional operative mode, known to experts in the field and in accordance with what has been previously described and indicated in Fundamental and Practical Aspects of the Claus Sulfur Recovery Process P. D. Clark, N. I. Dowling and M. Huang, Alberta Sulfur Research Ltd., Calgary, Alberta, Canada, is used when, in the refinery in which the hydrodesulfurization units U1 and U2 are present, there are other $H_2S$ sources such as to consider the contribution of the HDO/ISO process negligible (for example hydrocrackers or other hydrodesulfurizations of hydrocarbon fractions): when operating according to this mode, the $CO_2/H_2S$ gaseous mixture is fed to the sulfur recovery unit, together with the $H_2S$ deriving from the other sources, wherein said sulfur recovery unit is used as such, i.e. without undergoing any modification. According to this mode, the method of the present invention comprises installing a connection line between T1 and the sulfur recovery unit.

The modified operative mode is suitable for treating low quantities of acid gas with an extremely low $H_2S$ content, as in the case in which there are no other significant $H_2S$ sources in addition to the HDO/ISO process: this mode preferably uses a unit of the Claus type and is carried out by the installation, from the unit T1, of a by-pass line of the hot section in the Claus unit (furnace) and by substitution of the catalyst of the first of the Claus reactors of the sulfur recovery unit with a catalyst suitable for the treatment of gaseous streams in which $H_2S$ is present in a concentration lower than 30% mole. Said catalyst can be selected, for example, from oxides of metals of group VIB combined with transition metals of group VIII and are described, for example, in U.S. Pat. No. 6,372,193 and in the documents cited therein.

In this case, the unit for the treatment of tail gas possibly present, continues to operate to ensure a further abatement of $SO_2$ emissions.

The sulfur recovery is completed by the condensation of the liquid sulfur in the collection tanks normally included in a sulfur recovery unit.

The hydrogen necessary for the production unit of hydrocarbon fractions from mixtures of a biological origin, containing fatty acid esters, by means of their hydrodeoxygenation and isomerization, comprises recycled hydrogen and a flow of make-up hydrogen, preferably mixed with recycled hydrogen and fed to the reactors A1 and A2 used for the HDO step and ISO step: said make-up hydrogen can be supplied, as previously indicated, by reforming units normally already present in refineries. In particular, heavy naphtha (BP 80-160° C.) can be fed to a catalytic reforming unit.

The reforming reaction conditions differ depending on the type of unit installed: for semigenerative reforming units, the operating pressure is 16-28 barg with a Platinum-Rhenium catalyst and a H/C ratio of <4; for continuous new-generation reforming units, the operating pressure is 2.5-5 bare with a Platinum-Tin catalyst and a H/C<3; the desired product is the reformate, a gasoline base with a high octane number (98-101), with the contemporaneous formation of $H_2$.

Natural gas, fuel gas, LPG or virgin naphtha are fed to the steam reforming unit; the steam reforming reaction takes place with a nickel catalyst on alumina at high temperatures 750-900° C. and an operating pressure of 20-40 barg. The desired product is $H_2$.

The hydrogen deriving from reforming can then fed to the reactors (A1) and (A2) by means of pre-existing lines or specific lines installed for the purpose, respectively indicated as LH1, to the hydrodeoxygenation reactor A1, and LH2, to the isomerization reactor A2, and possibly after purification and concentration of the hydrogen flow by means of a PSA system. This configuration allows a separate and autonomous hydrogen feed to be obtained for each reactor, thus improving the flexibility and operability of the plants. This aspect represents an improvement with respect to normal hydrodeoxygenation processes of vegetable oils, which envisage a single hydrogen circuit for the two reactors. The PSA (pressure swing adsorption) system, when present, uses for example a series of beds filled with adsorbent material, typically a zeolite. The stream of gas rich in hydrogen flows through the bed, the gaseous products are adsorbed and, as hydrogen has a lesser tendency to be adsorbed, a flow of pure hydrogen is obtained at the outlet of the PSA unit. The regeneration of the adsorbing bed must be cyclically effected by depressurization.

A purification system of the feedstock of a biological origin can be additionally added to the production unit of hydrocarbon fractions from mixtures of a biological origin, containing fatty acid esters, by means of their hydrodeoxygenation and isomerization, obtained with the transformation method of hydrodesulfurization unit of the present invention.

Said purification system is situated upstream of the reactor (A1) in which the HDO step is carried out and comprises a degumming, decoloring, deacidification and deodorizing unit. The purpose of this system is to remove the impurities that can poison the HDO catalyst, such as metals (P, Fe, Ca, Mg, K, Na) and nitrogen and reduce the content of free fatty acids.

FIG. 1 shows a scheme example relating to the HDO/ISO unit deriving from the revamping method of the present invention: the dashed parts and lines correspond to the new installations according to the method of the present invention, whereas the continuous parts and lines correspond to the pre-existing hydrodesulfurization equipments.

In particular, in FIG. 1, Feed is the mixture of a biological origin which is fed to the HDO/ISO unit, where said mixture can be, for example, a refined vegetable oil, i.e. with a content of fatty acids not higher than 1,000 ppm by weight.

The fresh feedstock of vegetable oil is fed through line 1 to the surge drum S1 after mixing with part of the reaction product which is recycled through line R1: equalization of the feedstock composed of fresh feed and the fraction of recycled product therefore takes place in S1.

The feedstock leaving S1 reaches the feed-effluent exchanger E1 through line 2, where the pump P1 is located.

The heat exchange between the feedstock and the product leaving the reactor A1 takes place in E1. The feedstock reaches the hydrogen feeding line 4 through line 3, and the mixture of hydrogen and feed is fed to the reactor A1 through line 5: the oven F1 that heats the mixture to the reaction temperature situated on this line.

The hydrodeoxygenation product leaving the reactor reaches the exchanger E1 through line 6 and subsequently reaches the air exchanger a through line 7 and the high-pressure separator H1 through line 7a. The separation of the water SW, of the hydrocarbon fraction formed during the hydrodeoxygenation step and of the gaseous mixture prevalently consisting of $H_2$, $H_2S$ and $CO_2$, takes place in said separator H1. The hydrocarbon fraction is sent through line 8 to the low-pressure separator L1. The mixture of $H_2$, $H_2S$ and $CO_2$ is sent through line 9 to the acid gas treatment unit T1. The $CO_2$ and $H_2S$ are absorbed in this acid gas unit T1 by means of a specific absorbent and said absorbent is regenerated: a stream of hydrogen and a stream of $CO_2$ and $H_2S$ are therefore obtained at the outlet of the unit T1. The stream of hydrogen reaches line 11 through line 10, which feeds hydrogen deriving from an internal source of the refinery, for example a reforming unit. The compressors K1 and K2 are present on line 10 and line 11 respectively. The hydrogen comes from line I which represents the hydrogen supply network of the refinery. The resulting hydrogen flow reaches the feed line 3 through line 4. Lines 4a and 4b branch off from line 4, which allow part of the hydrogen to be fed at different heights of the reactor also obtaining quenching effect. The stream of $CO_2$ and $H_2$ at the outlet of the unit T1 reaches the acid gas treatment unit T3 through line 12.

The separation of $CO_2$ and $H_2S$ takes place in said acid gas unit T3 through two absorption steps with specific absorbents and their respective regeneration: a stream of $H_2S$ and a stream of CO are therefore obtained at the outlet of the unit T3.

The stream of $H_2S$ leaving T3 reaches the suction of the compressor K1, through the line R3, where the hydrogen flow of line 10 also arrives.

The stream of $CO_2$ leaving T3 is fed, through line 13, to the final thermo-combustor of the Claus plant or is sent to one of the refinery ovens suitably equipped with specific flues for the insertion of said stream.

A further separation of water SW takes place in the low-pressure separator L1, together with the separation from the hydrocarbon mixture from the Fuel Gas (FG), which is removed through line 41. The hydrocarbon mixture is then sent to the fractionation column C1 through line 14, on which the exchanger b is situated.

At the head of the fractionation column, line 29 brings a mixture of gas rich in propane and water to the condenser a1. Said mixture is fed through line 30 to an accumulator M, where it is carried out the separation of the water, of the gas rich in propane which is removed through line 31 and of the liquid used as reflux in the fractionation column C1, through line 32 and the pump P3. The gas rich in propane is indicated as LPG as it reaches the specifications of commercial LPG after a washing with amines not shown in the FIGURE.

A hydrocarbon fraction substantially containing linear paraffins having a number of carbon atoms which depends on the type of feed used, is separated from the bottom of the fractionation column. Said hydrocarbon fraction reaches the vacuum dryer V1 by means of line 15 on which the exchanger c is situated. The flow of hydrocarbon product leaving V1, passes through line 16 into the pump d and then to the exchanger and through line 17, before being partly fed to the subsequent isomerization section through line L and partly recycled into the feed through line R1.

The hydrocarbon product of the HDO section leaving the exchanger is fed through line L to the surge drum S2. The recycling line R2 of the isomerization product is inserted on line L and equalization of the feed is obtained in S2.

The feed leaving S2 reaches the exchanger E2 through line 18 on which the pump P2 is situated.

The heat exchange between the feed and the product leaving the reactor A2 takes place in E2. The feed reaches the hydrogen feeding line 20, through line 19, and the mixture of hydrogen and feed is fed through line 21 to the reactor A2: the oven F2 which heats the mixture to the reaction temperature is situated on said line.

The isomerization product leaving the reactor A2 reaches the exchanger E2 through line 22 and subsequently reaches the air exchanger a2 through line 23 and the high-pressure separator H2 through line 24. The separation of the water SW, of the isomerized hydrocarbon fraction formed during the isomerization step and of hydrogen takes place in said separator H2. The hydrocarbon fraction is sent through line 25 to the low-pressure separator L2. The stream of hydrogen leaves the separator H2 through line 26 and said line 26 joins the line X, whose function is to by-pass the acid gas treatment unit T2. T2 is part of the hydrodesulfurization unit which has been revamped and is not used in the new HDO/ISO unit. The line X therefore allows the hydrogen flow not to pass through T2 and joins line 27, through which the hydrogen flow reaches line 28, which feeds hydrogen deriving from an internal source of the refinery, for example a reforming unit. The compressors K3 and K4 are present on line 27 and 28 respectively. The resulting hydrogen flow reaches the feed line 19 through line 20. The existing lines 20a and 20b branch off from line 20, which allow part of the hydrogen to be fed at different heights of the isomerization reactor also obtaining a quenching effect.

A further separation takes place in the low-pressure separator L2, of the water SW from the isomerized hydrocarbon mixture and from the Fuel Gas (FG) which is removed by means of line 33. The isomerized hydrocarbon mixture is then sent to the fractionation column C2 by means of line 34, on which the exchanger b2 is situated. An isomerized hydrocarbon fraction is separated from the bottom of the fractionation column. Said hydrocarbon fraction reaches the vacuum dryer V2 through line 35 on which the exchanger s is situated. The flow of isomerized hydrocarbon product, through line 36, is fed to the pump P3: the flow leaving the pump is partly recovered and partly recycled through line R2 to the line L. The product recovered is a high-quality diesel of a biological origin (Green Diesel).

At the head of the fractionation column C2, the line 37 brings a mixture of fuel gas and naphtha to the exchanger a3. Said mixture is fed through line 38 to an accumulator M1. The Fuel Gas is separated from the naphtha in said accumulator M1. The fuel gas is removed through line 39 which joins line 25.

The naphtha is partly recycled, through line 40, on which the pump P4 is situated, to the fractionation column C2, (line 40a) and partly recovered as high-quality naphtha of a biological origin (Green Naphtha).

A method has therefore been found for transforming hydrodesulfurization units into conversion units of mixtures of a biological origin based on fatty acid esters into fuel bases, whose main product is diesel and diesel component, in addition to naphtha and LPG, with minimum variations in the equipment already existing and a limited number of suitably selected substitutions and new installations.

The conversion unit of mixtures of a biological origin obtained with the transformation method of the present invention is also an object of the invention, as is also a HDO/ISO process carried out using said conversion unit of mixtures of a biological origin.

A further object of the invention also relates to a HDO/ISO process for the production of a hydrocarbon fraction, wherein said hydrocarbon fraction can be used as a fuel, or fuel component, starting from a mixture of a biological origin containing fatty acid esters, and possibly containing free fatty acids, which comprises the following steps:
(1) hydrodeoxygenation of the mixture of a biological origin;
(2) separation of the mixture resulting from step (1) into a hydrocarbon fraction and a gaseous mixture G comprising $H_2$, $CO_2$ and $H_2S$,
(3) hydroisomerization of the hydrocarbon fraction obtained in step (2),
(4) separation of the gaseous mixture G into a stream of hydrogen and a gaseous mixture of $CO_2$ and $H_2S$,
(5) separation of the gaseous mixture of $CO_2$ and $H_2S$ obtained in step (4) into a stream of $H_2S$ and a stream of $CO_2$,
(6) feeding the stream of $H_2S$ obtained in step (5) to the hydrodeoxygenation step.

The hydrogen obtained in step (4) is also re-fed to the hydrodeoxygenation step. The re-feeding of the $H_2S$ to the hydroisomerization step allows the catalyst of said step to be kept in its sulfided form, and therefore active, without the necessity of having to add further sulfiding agents, or in any case adding them in a reduced quantity.

The revamping method, object of the invention, the HDO/ISO unit obtained using the revamping method of the present invention, the HDO/ISO process using said HDO/ISO unit, and the particular process comprising steps (1)-(6) indicated above, allow the production of diesel having excellent properties (high octane index, optimum cold properties, high calorific value) and a stream of gas rich in propane which, after purification with amines, is in line with the specifications of commercial LPG obtained with the known methods, at the same time maintaining its biocomponent nature. A kerosene fraction and a naphtha fraction are also obtained, wherein said naphtha fraction can be used as such as gasoline base, by upgrading its bio portions thanks to integration in the gasoline pool of refineries, or sent to reforming, thus contributing to the synthesis of hydrogen to be used in the HDO/ISO process.

The invention claimed is:

1. A biorefinery, comprising a production unit of a hydrocarbon fraction from a mixture of a biological origin comprising a fatty acid ester by means of hydrodeoxygenation and isomerization of the mixture of biological origin,
wherein the biorefinery is obtained from a refinery comprising a system comprising two hydrodesulfurization units, (U1) and (U2), by means of a method for revamping the refinery into the biorefinery,
wherein each of the hydrodesulfurization units (U1) and (U2) comprises:
a hydrodesulfurization reactor (A1) for the unit (U1) and a hydrodesulfurization reactor (A2) for the unit (U2), wherein each of the hydrodesulfurization reactors comprises a hydrodesulfurization catalyst;
a heat exchanger that exchanges heat between a feedstock and effluent of the hydrodesulfurization reactor;
a heating system that is different from the heat exchanger that heats the feedstock upstream of the hydrodesulfurization reactor; and
an acid gas treatment unit downstream of the hydrodesulfurization reactor, comprising an absorbent (B) for $H_2S$, (T1) in the unit (U1) and (T2) in the unit (U2), the method comprising:
installing a line L between the units (U1) and (U2) which connects them in series;
installing a recycling line of the product for the unit (U1) and optionally for the unit (U2),
substituting the hydrodesulfurization catalyst in the hydrodesulfurization reactor (A1) with a hydrodeoxygenation catalyst;
substituting the hydrodesulfurization catalyst in the hydrodesulfurization reactor (A2) with an isomerization catalyst; and
installing a line to bypass the acid gas treatment unit (T2) of the unit (U2); and
substituting the absorbent (B) in the acid gas treatment unit (T1) with a specific absorbent for $CO_2$ and $H_2S$.

2. A process for producing a hydrocarbon fraction starting from a mixture of a biological origin comprising a fatty acid ester, the process comprising:
(1) performing hydrodeoxygenation of the mixture of a biological origin; and
(2) performing hydroisomerization of a product resulting from the hydrodeoxygenation (1), after optionally purifying,
wherein the process is effected with the biorefinery according to claim 1.

3. A HDO/ISO process for producing a hydrocarbon fraction starting from a mixture of a biological origin comprising a fatty acid ester and optionally a free fatty acid, the HDO/ISO process comprising:
(1) performing hydrodeoxygenation of the mixture of biological origin,
(2) separating a product resulting from the hydrodeoxygenation (1) into a hydrocarbon fraction and a gaseous mixture G comprising H2, CO2 and H2S,
(3) performing hydroisomerization of the hydrocarbon fraction obtained in the separating (2),
(4) separating the gaseous mixture G into a stream of hydrogen and a gaseous mixture of $CO_2$ and $H_2S$,
(5) separating the gaseous mixture of $CO_2$ and $H_2S$ obtained in the separating (4) into a stream of $H_2S$ and a stream of $CO_2$, and
(6) feeding the stream of $H_2S$ obtained in the separating (5) to the hydrodeoxygenation (1).

4. The process according to claim 3, wherein the hydrocarbon fraction produced is a fuel or fuel component.

5. The process according to claim 4, wherein the fuel or fuel component is LPG, kerosene, diesel, or naphtha.

* * * * *